United States Patent
Zak (10) Patent No.: US 6,452,991 B1
(45) Date of Patent: Sep. 17, 2002

(54) SYSTEMS AND METHODS FOR ACQUIRING CHANNEL SYNCHRONIZATION IN TIME DIVISION MULTIPLE ACCESS COMMUNICATIONS SYSTEMS USING DUAL DETECTION THRESHOLDS

(75) Inventor: Robert A. Zak, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/220,405

(22) Filed: Dec. 30, 1998

(51) Int. Cl.[7] .............................................. H04L 1/00
(52) U.S. Cl. .................................... 375/365; 375/368
(58) Field of Search .................................. 375/365, 368, 375/130, 150, 366, 367; 370/513, 514, 515

(56) References Cited

U.S. PATENT DOCUMENTS

| | | | |
|---|---|---|---|
| 3,823,266 A | 7/1974 | Van Elk et al. ............. | 178/69.5 |
| 5,121,414 A | 6/1992 | Levine et al. ................. | 375/96 |
| 5,177,740 A | 1/1993 | Toy et al. ................. | 370/100.1 |
| 5,373,536 A | 12/1994 | Dehner, Jr. et al. ......... | 375/106 |
| 5,440,597 A * | 8/1995 | Chung et al. ................. | 375/200 |
| 5,509,036 A | 4/1996 | Nakata ........................ | 375/368 |
| 5,561,665 A | 10/1996 | Matsouka et al. ............. | 370/20 |
| 5,627,863 A * | 5/1997 | Aslanis et al. ............... | 375/357 |
| 5,680,421 A * | 10/1997 | Shiino et al. ................ | 375/368 |
| 5,966,402 A * | 10/1999 | Yamamoto ................... | 375/150 |
| 6,167,037 A * | 12/2000 | Higuchi et al. ............. | 370/335 |

OTHER PUBLICATIONS

Copy of International Search Report for PCT/US99/27379.

* cited by examiner

Primary Examiner—Stephen Chin
Assistant Examiner—Chieh M. Fan
(74) Attorney, Agent, or Firm—Myers Bigel Sibley & Sajovec (57) ABSTRACT

Systems and methods for locating a known multi-symbol syncword in a received signal are disclosed, wherein a potential syncword is located in a first batch of samples of the received signal which has a correlation energy with the known syncword which exceeds a first detection threshold. A correlation energy with the known syncword for a group of samples in a second batch of samples of the received signal is determined, where the group of samples in the second batch of samples are selected based on the location of the potential syncword within the first batch of samples. The correlation energy associated with the group of samples in the second batch of samples is compared with a second detection threshold that is higher than the first detection threshold. The location of the known syncword may be identified based upon the comparison of the correlation energy associated with the group of samples in the second batch of samples with the second detection threshold.

35 Claims, 6 Drawing Sheets

SYSTEMS AND METHODS FOR ACQUIRING CHANNEL SYNCHRONIZATION IN TIME DIVISION MULTIPLE ACCESS COMMUNICATIONS SYSTEMS USING DUAL DETECTION THRESHOLDS

FIELD OF THE INVENTION

The present invention relates generally to systems and methods for acquiring channel synchronization and, more particularly, to systems and methods for acquiring such synchronization in time division multiple access communications systems.

BACKGROUND OF THE INVENTION

Many digital cellular telephone networks use time division multiple access ("TDMA") channels for dividing communications resources among the terminals using the network. By way of example, digital cellular telephone networks operating under the ANSI-136 standard employ a frequency division multiple access ("FDMA")/TDMA system in which the frequency band is divided into numerous 30 kHz subbands which are each further divided into up to six separate communications time slots. The users involved with a particular phone call in an ANSI-136 network access one of the available time slots on a specific frequency sub-band. Thus, up to six separate calls may occur simultaneously on any given sub-band, as the six sets of users share the sub-band by transmitting only during their assigned time slots.

To establish a phone call or to lock to a digital control channel in an ANSI-136 or other FDMA/TDMA network, a user terminal tunes its transceiver to one of the sub-bands and acquires synchronization to a predetermined time slot in that sub-band. In cellular systems established under ANSI-136, this synchronization is accomplished by determining the location of a synchronization sequence or "syncword." In traditional TDMA systems, a unique syncword is transmitted during each time slot, typically as the first few modulated symbols in the time slot or "burst." Thus, for example, under the ANSI-136 protocol, a total of 162 differential quadrature phase shift keyed ("DQPSK") symbols are transmitted in each time slot or burst, the first 14 of which comprise the above-mentioned syncword. As ANSI-136 specifies up to six time slots per frequency sub-band, a total of six unique syncwords are specified, one for each of the TDMA time slots.

In typical digital cellular telephone systems, a cellular terminal acquires synchronization via the following process. First the local oscillator on the terminal is tuned to the center frequency of the appropriate frequency band or subband, and a portion of the signal being transmitted on that band is received, sampled and digitized so as to provide a "batch" of digitized samples to the processor included within the telephone. Under ANSI-136, a "batch" typically comprises a total of 1408 samples, which corresponds to eight separate samples per symbol period over 176 consecutive symbol periods. Note that a batch of 176 symbols is typically used (instead of the 162 symbols which are transmitted during a time slot) to ensure that the 14-symbol syncword is not divided between the beginning and the end of the batch.

Upon receiving a batch of 1408 samples, the processor performs a series of correlations on the received batch of samples to determine which 14-symbol (112 sample) portion of the batch has the highest correlation with any one of the six, predefined, 14-symbol syncwords. This is typically accomplished by correlating the first 112 samples (samples 1–112 out of the 1408 sample batch) with each of the six syncwords, then correlating samples 2–113 with each of the six syncwords, and so on, until each consecutive group of 112 samples in the batch has been correlated with each of the six syncwords. This may require a total of 7,776 separate complex correlations. The results of these correlations are then compared to determine the location of the group of 112 samples which had the highest correlation energy with any of the six predefined syncwords.

Unfortunately, the local oscillators provided in many cellular telephones and other wireless communications terminals demonstrate some degree of error in frequency. This error may arise due to component tolerances, temperature changes, or aging or other effects, and may, in many instances, exceed several kHz or more. Additionally, local oscillators typically have varying settling time, which also may introduce a dynamic frequency error. The net effect of these frequency errors is to reduce the correlation energy detected when a group of received samples which generally correspond to a known syncword are correlated with that syncword. Such frequency effects are particularly problematic in FDMA/TDMA networks which have frequent hand-offs, a large number of frequency sub-bands, and/or low cost user terminals (which typically have less accurate local oscillators).

To identify and compensate for anticipated frequency errors, the above described correlation process may be performed multiple times, with the batch of samples "pre-rotated" in phase a different amount on each iteration to adjust the frequency (and hence offset the frequency error). Depending upon component tolerances and the magnitude of the frequency change which may occur during hand-offs, as many as thirteen iterations (each of which, in typical systems, comprises 7,776 complex correlations) may be required in order to obtain correlations over a sufficient range of frequencies such that there is a high probability of detecting the syncword.

The highest correlation energy obtained during the above described correlation process (which may involve over 100,000 complex correlations) is then compared to a fixed syncword detection threshold. If this correlation energy value does not exceed the fixed threshold, the terminal will typically repeat the process with one or more new batches of digitized samples. Ultimately, if none of these repeated efforts to acquire synchronization are successful, the terminal will conclude that no base station is transmitting on that sub-band (or there is too much noise to acquire it), and synchronization on a different frequency sub-band will then be attempted. However, if the correlation energy exceeds the detection threshold, then the syncword number (e.g., 1, 2, 3, 4, 5 or 6 in ANSI-136), the position of the syncword within the batch, and the phase pre-rotation (which corresponds to frequency error) are reported to the microprocessor. Note that the detection threshold typically is set low enough to allow detection of syncword patterns during periods of channel impairment.

If a valid syncword pattern is found, the microprocessor adjusts the local oscillator frequency based on the phase prerotation (frequency error) associated with the identified syncword, and receives and samples a second segment of the signal transmitted by the base station so as to provide a second batch of digitized samples. Typically, the timing for the reception of this second batch of samples is adjusted so that the identified syncword appears as the first group of samples in the batch. The above-described process is repeated in order to determine a new phase pre-rotation, and this process continues until the phase pre-rotation (the frequency error) is within a specified threshold. Once the frequency error is within the specified threshold, the correlation process may be repeated one or more additional times to confirm the presence of a syncword in two or more bursts to reduce the possibility of detecting false synchronization patterns. If initial synchronization is not accomplished within a predetermined amount of time, a failure may be declared on that frequency sub-band.

The above-described synchronization method may require significant time. This adversely affects both the time a user must wait to complete calls and the "muting" time which occurs when a cellular user switches communications between two different base stations. Another traditional method, which requires less processing time, performs complex correlations using only one sample per symbol period. Thus, for example, if the received signal is sampled at a rate of eight samples per symbol, the first correlation would use samples 1, 9, 17, . . . 105; the second correlation would use samples 9, 17, 25, . . . 113; and so on. This method reduces the processing time by nearly an order of magnitude as compared to the method described above (972 correlations per frequency rotation versus 7,776). However, this method has the limitation that the correlation energies may be lower due to sampling the received signal at sub-optimal sampling positions (selecting samples in-between symbol energy peaks). Because of the anticipated lower correlation energies, the detection threshold typically is lowered. Unfortunately, such a lower threshold increases the probability of detecting false synchronization patterns due to frequency error and other signal impairments such as noise and Rayleigh fading. These "false positives" can also significantly increase the time required to acquire synchronization, as the user terminal must detect that a false acquisition has occurred (after it fails to locate syncwords during subsequent bursts) and repeat the synchronization process.

In light of the above mentioned problems with conventional synchronization methods, there exists a need for systems and methods for quickly acquiring synchronization in TDMA communications systems. Preferably, these systems and methods will work well with all syncword modulation types, and are capable of accommodating at least several kHz in frequency error due to component tolerances in the local oscillator and to the additional frequency error resulting during the settling of the local oscillator. Additionally, these systems and methods will preferably reduce the number of false positives which occur during the synchronization process.

SUMMARY OF THE INVENTION

In view of the above limitations associated with existing systems and methods for acquiring synchronization in TDMA and FDMA/TDMA communication networks, it is an object of the present invention to provide synchronization systems and methods that are capable of accelerating acquisition times.

Another object of the present invention is to provide synchronization systems and methods which can tolerate both the frequency error and settling time characteristics common to low cost local oscillators.

It is still a further object of the present invention to provide synchronization systems and methods which can result in very few false detection of syncwords.

Additional objects, features and advantages of the present invention will become apparent upon reading the following detailed description and appended claims and upon reference to the accompanying drawings.

These and other objects of the present invention are provided by systems and methods for acquiring synchronization which initially correlate a batch of samples from a received signal which were sampled at a low sampling rate with one or more known syncwords to identify in the batch the group of samples with the highest correlation to any one of the syncwords. This highest value of the correlation energy is then compared to a relatively low detection threshold. If the correlation energy exceeds the relatively low detection threshold, one or more additional correlations are performed at "nearby" locations using a higher sampling rate and a more stringent detection threshold. In this manner it is possible to significantly reduce the total number of correlations that are used, as most of the correlations may be performed using relatively few samples per symbol. Moreover, as detection of the syncword pattern is ultimately based upon comparison to a relatively high detection threshold, the systems and methods of the present invention can reduce the possibility that the detection algorithm incorrectly locates the presence of a syncword pattern (a "false positive"), and can further reduce acquisition time by halting the process upon identification of a sequence with a correlation energy which exceeds the higher detection threshold. Accordingly, the systems and methods of the present invention both improve the accuracy of the synchronization process while potentially significantly reducing the acquisition time.

In one embodiment of the present invention, a method for locating a known multi-symbol syncword in a received signal is provided. Pursuant to this method, a potential syncword is located in a first batch of samples of the received signal which has a correlation energy with the known syncword which exceeds a first detection threshold. A correlation energy for a group of samples in a second batch of samples of the received signal with the known syncword is determined, where the group of samples in the second batch of samples are selected based on the location of the potential syncword within the first batch of samples. The correlation energy associated with the group of samples in the second batch of samples is compared with a second detection threshold that is higher than the first detection threshold. The location of the known syncword may be identified based upon the comparison of the correlation energy associated with the group of samples in the second batch of samples with the second detection threshold.

In a preferred embodiment of this method, the potential syncword may be located by identifying the group of consecutive samples within the first batch of samples which has the highest correlation energy with the known syncword and by comparing the correlation energy associated with the identified group of consecutive samples with the first detection threshold. The location of the syncword may be identified as the group of samples in the second batch of samples which has a correlation energy that exceeds the second detection threshold. The first batch of samples may be obtained by sampling the received signal at a first sampling rate and the second batch of samples may be obtained by sampling the received signal at a second sampling rate that is higher than the first sampling rate. The group of samples in the second batch of samples may be selected to correspond to substantially the same group of symbols as the potential syncword. Systems for performing these methods are also provided.

Thus pursuant to the teachings of the present invention improved systems and methods for acquiring synchronization are provided which can reduce the time required to obtain synchronization and can increase the accuracy of the synchronization process. Moreover, these systems and methods work with a variety of modulation schemes, are flexible with respect to varying channel conditions and further are capable of tolerating variations in component tolerances which impact the synchronization process such as local oscillator accuracy and settling time.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Additionally, it will be understood by those of skill in the art that the present invention may be advantageously used in a variety of applications, and thus the present invention should not be construed as limited in any way to the example applications described herein. Like numbers refer to like elements throughout.

Figure 1:
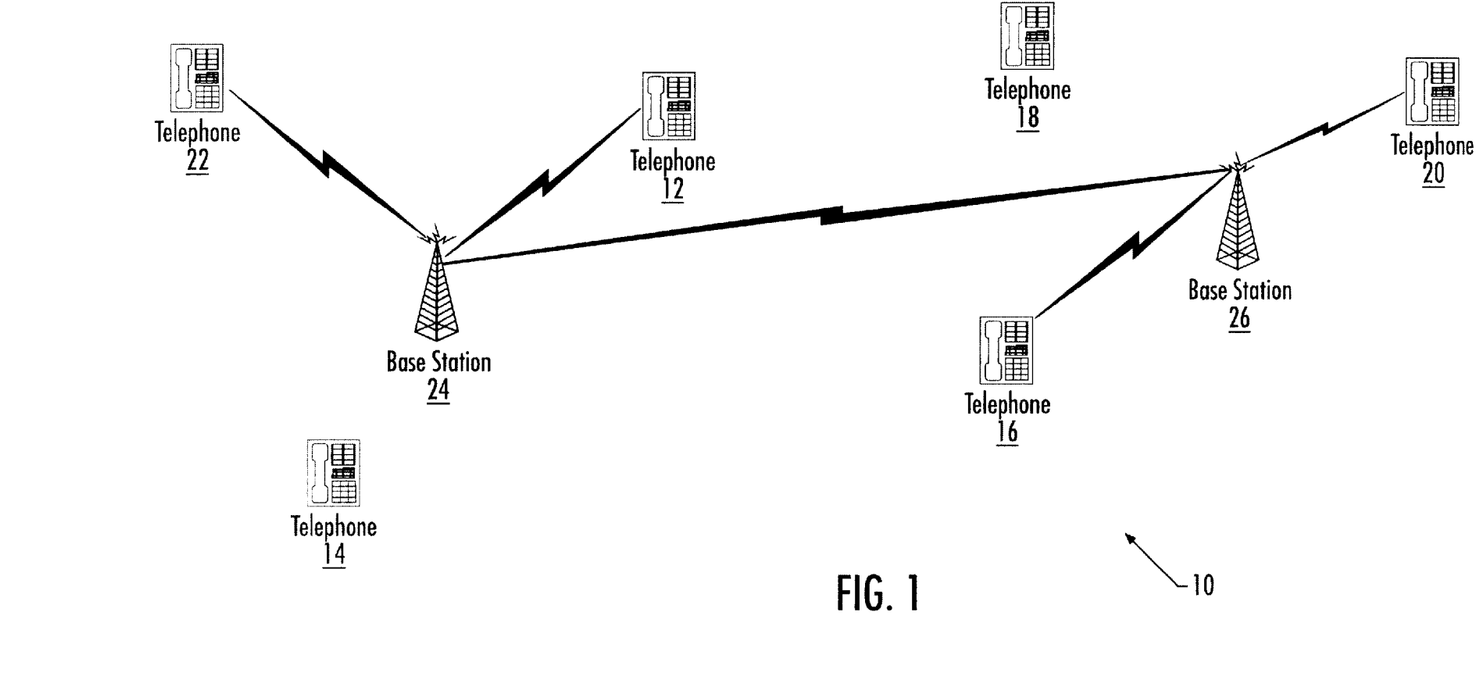
FIG. 1 depicts a set of users communicating in a FDMA/TDMA communications network.

FIG. 1 depicts a cellular telephone communications network 10 in which the synchronization systems and methods of the present invention may be used. It will be understood in light of the present disclosure, however, that the systems and methods of the present invention have application beyond networks such as those depicted in FIG. 1, and in fact may be suitable for use in any digital communications network in which acquisition of timing synchronization is required. In the cellular telephone network 10 illustrated in FIG. 1, a plurality of user terminals 12, 14, 16, 18, 20, 22 communicate with each other and other communications terminals (which are not pictured) via base stations 24, 26 that receive calls from various of the user terminals and retransmit the calls to other user terminals either directly, via other base stations, or via another telecommunications network (such as the conventional telephone network).

Figure 2:
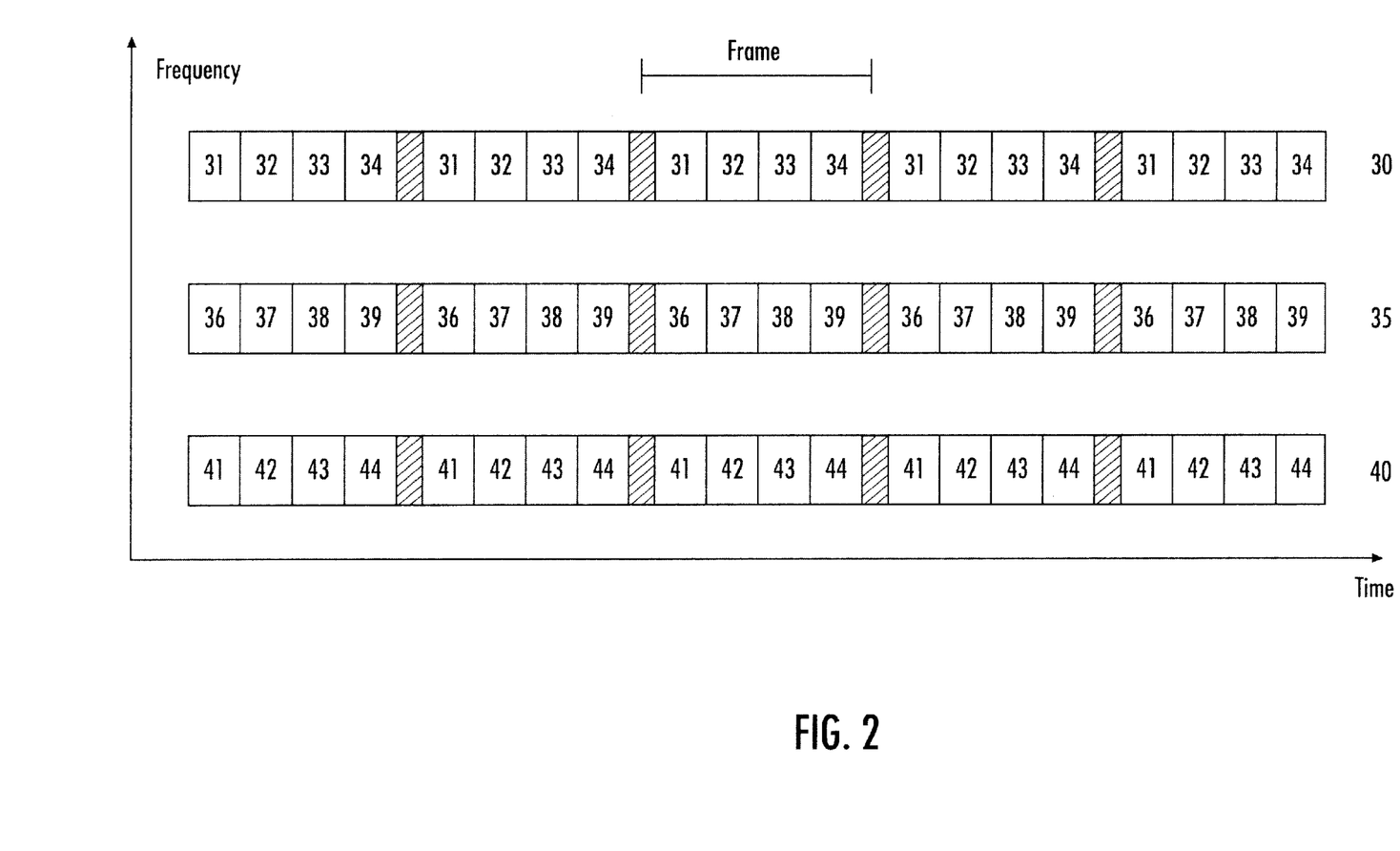
FIG. 2 illustrates a channel and frame structure in an FDMA/TDMA communication system.

As discussed above, the systems and methods of the present invention may be suitable for use in any digital communications network in which acquisition of timing synchronization is required. However, in a preferred application, the methods are used in communications networks which use an FDMA/TDMA access format. FIG. 2 illustrates the channel structure of an exemplary FDMA/TDMA network which provides up to a total of twelve channels. As shown in FIG. 2, the radio frequency communications are transmitted over three separate FDMA frequency sub-bands 30, 35, 40. Each of these sub-bands are then further divided into four separate time-multiplexed channels 31, 32, 33, 34; 36, 37, 38, 39; 41, 42, 43, 44. As indicated in FIG. 2, this time multiplexing is accomplished by dividing the communications which are transmitted over the channel into a repeating series of "frames," wherein each frame is subdivided into up to four separate time slots. Each of these repeating time slots 31, 32, 33, 34; 36, 37, 38, 39; 41, 42, 43, 44 comprises a channel. Thus a user terminal which desires to communicate over the network will seek to acquire access to one of these channels by tuning to the appropriate frequency, identifying a channel which currently is not in use, and acquiring timing synchronization with that channel.

As indicated previously, a terminal which seeks to access a TDMA communications systems first acquires synchronization to one of the time slots which comprises a communications channel. The user terminals may acquire such synchronization by receiving a signal which is transmitted by the base station and identifying the location in that signal of a predefined sequence of symbols which comprise a known synchronization word or "syncword." As indicated above, a unique syncword is typically provided for each separate time slot in a frequency sub-band, and the syncword is located at a predefined position within the time slot. Thus, by way of example, in communications networks operating under the ANSI-136 standard, the syncwords comprise unique sequences of 14 consecutive symbols which are implemented as the first 14 symbols of each 162 symbol time slot. As ANSI-136 provides for dividing each of the frequency bands which carry communications into up to six separate time-mulitplexed channels, six unique synchronization sequences are provided. Once the user terminal identifies the location of a syncword, it is possible for the terminal to thereby synchronize its timing with the timing of the transmitting base station, thereby allowing the terminal to communicate in one of the predefined time slots.

Under ANSI-136, the symbols which comprise the six syncwords are encoded using a differential quadrature phase shift keying modulation ("DQPSK"). However, it will be understood in light of the present disclosure that the methods described herein can be used with syncwords modulated using any of a wide variety of modulation techniques, such as other multi-phase PSK modulations and/or non-differential modulation techniques.

Figure 3:
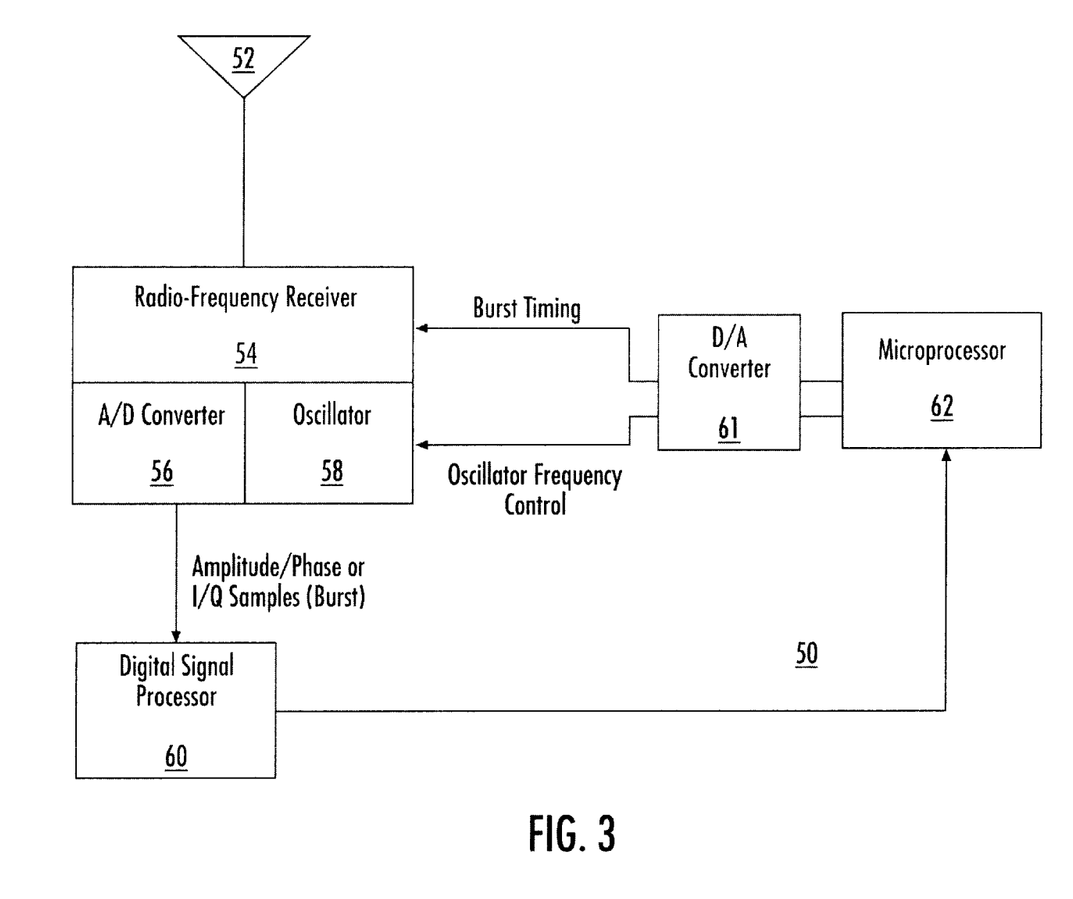
FIG. 3 is a block diagram of the subsystems of a cellular terminal which may be used in performing the methods of the present invention.

A block diagram of one embodiment of a system 50 according to the present invention is illustrated in FIG. 3. As illustrated therein, the system comprises a receive antenna 52, a radio frequency receiver 54, a digital signal processor 60 and a microprocessor 62. Receive antenna 52 may be any antenna suitable for receiving radio frequency signals, such as dipole, monopole, helix, and/or patch antennas, or any other of a wide variety of antennas suitable for wireless communications which are known to those of skill in the art. Various radio frequency receivers 54 which are suitable for use with the present invention are also known to those of skill in the art and hence will not be discussed further herein, except to note that the radio frequency receiver may include (or have associated with it) an analog-to-digital ("A/D") converter 56 and a local oscillator 58. The local oscillator 58 is used to tune the radio frequency receiver 54 to a desired frequency at which the terminal will transmit and/or receive radio frequency signals, and the A/D converter 56 is used to digitize samples of any received signal for processing by the radio frequency receiver 54, digital signal processor 60, and/or microprocessor 62. A digital-to-analog ("D/A") converter 61 may also be provided to facilitate control by the microprocessor 62 of burst timing and/or oscillator frequency.

Digital signal processor 60 may be used to perform a series of correlations for identifying the portion of a received signal which correlates highly with one or more of the predefined syncwords. As will be understood by those of skill in the art, while correlations may conveniently be performed using a digital signal processor, a variety of other hardware and/or software is available for performing such correlations, and any suitable method of performing such correlations may be employed with the present invention. For instance, the correlation may be performed using a general purpose microprocessor.

The microprocessor 62, while not necessarily required, may be used to facilitate control of the frequency of the local oscillator 58, particularly in FDMA/TDMA systems in which a user terminal may communicate at a variety of different frequencies. As indicated in FIG. 3, microprocessor 62 may also be used to align burst timing after the syncword has been located.

As indicated above, in traditional methods of acquiring channel synchronization a large number of correlations are performed in which the correlation energy associated with each group of consecutive samples in a batch are compared to a fixed threshold. Pursuant to the teachings of the present invention, the number of correlations can be reduced significantly by sampling the received signal at a lower sampling rate (e.g., at one sample per symbol as compared to the traditional eight samples per symbol), which automatically reduces the required number of correlations by almost an order of magnitude. As the effect of intersymbol interference increases as the sampling rate decreases, in the systems and methods of the present invention it will typically be preferable to use a relatively low detection threshold (i.e., the correlation energy which, if exceeded, indicates the possible presence of a syncword), to avoid the possibility that the method will fail to locate a syncword during periods of noisy channel conditions and/or intersymbol interference effects.

In the systems and methods of the present invention, once the possible presence of a syncword has been identified, additional correlations are performed at locations which are "nearby" the location of the potential syncword which was identified. These "retry" correlations are performed at locations which correspond to substantially the same group of symbols as the identified potential syncword (i.e., their locations overlap by at least 80% with the location of the identified potential syncword), and in a preferred embodiment of the present invention, the location of the samples used in the "retry" correlations is offset from the location of the identified potential syncword by less than one symbol). Moreover, these "retry" correlations typically are performed using a higher sampling rate (e.g., eight samples per symbol) to reduce the intersymbol interference effects and to more accurately establish synchronization. Additionally, a relatively high detection threshold is preferably used in evaluating whether or not the "retry" correlations indicate the presence of a syncword. The use of this higher threshold reduces the possibility that the method will incorrectly identify the presence of a syncword because of channel noise and/or intersymbol interference effects. Moreover, by using a relatively high detection threshold, it is also possible to have a large degree of confidence that a syncword has been found when the correlation energy associated with a group of samples exceeds the high detection threshold.

Accordingly, pursuant to the teachings of the present invention, it is possible to halt the correlation process once a group of samples have been identified with a correlation energy exceeding the relatively high detection threshold. This early cessation of the correlation process may also result in significant savings in expected acquisition time.

The present invention will now be described with respect to FIGS. 4–6, which are flowcharts illustrating various embodiments of the synchronization acquisition systems and methods of the present invention. It will be understood that the blocks in these flowcharts, and combinations of blocks in these flowcharts, can generally be implemented by general purpose computer hardware, special purpose computer hardware and/or via computer program instructions. If performed in software, the program instructions may be provided to a digital signal processor, microprocessor or the like such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks. Accordingly, blocks of the flowchart illustrations support combinations of means for performing the specified functions, combinations of steps for performing the specified functions and program instruction means for performing the specified functions.

Figure 4:
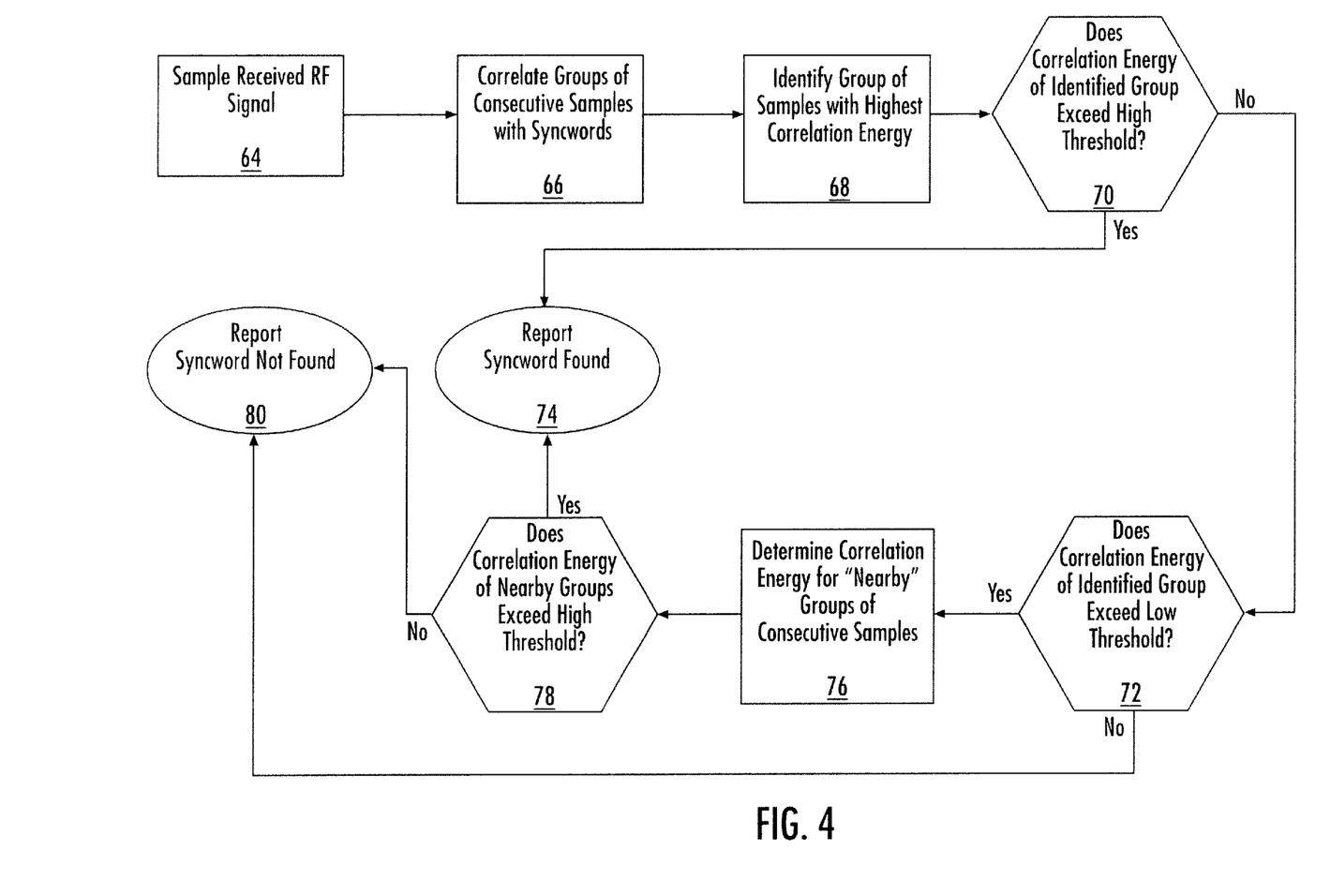
FIG. 4 is a flow chart illustrating systems and methods of channel synchronization according to the teachings of the present invention.

The flow chart of FIG. 4 illustrates one embodiment of the present invention. As shown in the figure, a portion of the radio frequency or other signal present in the frequency sub-band in which the terminal is attempting to acquire synchronization is received and then sampled (block 64). Typically, both the receiving and sampling are performed by a radio frequency receiver 54. Various groups of consecutive samples (which are of substantially the same length in symbols as the predefined syncword(s) used on that frequency sub-band) are then correlated with each of the syncwords (block 66) in order to identify the group of samples with the highest correlation energy to any of the predefined syncwords (block 68). The highest correlation energy value which is obtained through the correlations of block 66 and identified in block 68 is then compared to a relatively high detection threshold (block 70). If the correlation energy exceeds this high threshold, the syncword is considered found and the information regarding the location of the syncword within the received sample batch may be provided to the radio frequency receiver 54 and/or microprocessor 62 so that the user terminal may align its timing with the timing of the other users communicating on the various time division mulitplexed channels (block 74). If the correlation energy associated with the identified group of samples, however, does not exceed the high threshold, then a second comparison is performed using a lower detection threshold (block 72). In this second comparison, if the correlation energy associated with the identified group of samples does not exceed the lower detection threshold, then the user terminal may assume that the syncword has not been located (block 80). In this event, the terminal can reattempt acquisition using a new batch of samples, or can instead move to another frequency (in FDMA/TDMA communication systems) and attempt acquisition there. If the correlation energy, on the other hand, exceeds the lower detection threshold, the correlation energy for groups of consecutive samples which are close to or "nearby" the identified group of samples are calculated (block 76). The calculated correlation energy associated with these nearby groups of samples (the "retry" correlations) may then be compared to the high detection threshold (block 78), and based on the result of this comparison, the syncword will either be reported as found or as not found (blocks 74, 80).

In a preferred embodiment of the present invention, the relatively high detection threshold is set at a correlation energy of between 85% and 95%, and more preferably, the high detection threshold is established as a correlation energy of between 88% and 92%. Similarly, in a preferred embodiment of the present invention, the relatively low detection threshold is set at a correlation energy of between 65% and 75%, and, more preferably, is established as a correlation energy of between 68% and 72%. In contrast, prior art methods of synchronization acquisition may use a detection threshold of approximately 80% correlation energy. However, it will be understood that depending on the characteristics of the channel, the performance capabilities of the user terminals and other various parameters, the ideal relatively low and relatively high detection thresholds may vary significantly. Accordingly, the present invention is not intended to be limited to the above recited ranges for these parameters, which are only provided to serve as example ranges which may work well in typical communications systems.

As indicated in block 76 of FIG. 4, after the group of samples with the highest correlation energy has been identified, additional correlations are performed on groups of samples which are "nearby" the identified group. In a preferred embodiment of the present invention, a higher sampling rate (i.e., more samples are taken per symbol) is used in the correlations (block 76) performed for these nearby groups (the "retry" correlations), so as to reduce the effects of intersymbol interference and to more accurately identify the "edge" of the first symbol in the syncword. Preferably, the groups of consecutive samples at "nearby" locations which are correlated with the syncwords in block 76 of FIG. 4 comprise groups of samples which are offset from the group of samples identified in block 68 by less than one symbol position. For example, in one embodiment of the present invention two additional retry correlations may be performed—one on the group of samples falling approximately one-half a symbol position in front of the group of samples identified in block 68, and the other group of samples falling approximately one-half a symbol position after the group of samples identified in block 68. Depending upon the timing accuracy sought, more or less of these "retry" correlations may be performed.

As the "retry" correlations are typically performed using a larger number of samples per symbol than the initial correlations, it may be desirable to initially sample the received radio frequency signal at the higher sampling rate, but only use a subset of the samples (e.g., every eighth sample) in the initial correlations (block 66). In this manner, the higher density of samples is already available for the "retry" correlations (block 76). However, it will be understood that in an alternate embodiment of the present invention the radio frequency receiver 54 could receive and sample a second portion of the signal transmitted by the base station, timing the reception to correspond with the timing appropriate for the retry correlations, and use these samples for the retry correlations of block 76.

As noted in blocks 66 and 76 of FIG. 4, preferably both the initial and the retry correlations are performed on groups of consecutive samples. However, it will be understood that similar results may be obtained by performing these correlations on groups of nearly consecutive samples (e.g., a group of samples where a few samples are dropped), and hence the methods of the present invention are not limited to consecutive samples. It will also be appreciated that in instances where, as discussed above, a subset of the samples are used for the initial correlations (in the example above it was every eighth sample), that this subset of samples comprises its own batch of samples for determining whether or not samples are consecutive.

As indicated above, in FDMA/TDMA communication systems, a user terminal which is seeking to communicate over the network will typically need to tune its local oscillator 58 to one of the multiple frequency sub-bands at which channels are located, as well as acquire synchronization with a channel within that frequency sub-band. However, as relatively inexpensive local oscillators are used in many user terminals, component tolerances will often introduce several kHz or more of error in the frequency setting, and additional frequency error may occur because of oscillator settling time. Typically, the magnitude of these errors increases the greater the change in frequency which is required.

In order to compensate for local oscillator induced frequency error, it may be desirable to perform additional correlations where the phase of the complex samples of the received signal is pre-rotated, effectively modifying the frequency. Typically a phase rotation corresponding to a 300–1000 Hz frequency change is used. Depending on the anticipated range of frequency error, it may be necessary to perform correlations with as many as ten or more phase pre-rotations, to ensure that correlations are performed at a frequency relatively close to the center-frequency of the frequency sub-band. The number of pre-rotations may vary based on the extent to which the setting on the local oscillator is to be changed (i.e., the greater the frequency change, the greater the number of phase pre-rotations required). Typically, the number of phase pre-rotations or "steps" required is determined by reference to a look-up table which establishes the number of steps required based on the change in frequency contemplated. In a preferred embodiment of the present invention, methods for acquiring channel synchronization in FDMA/TDMA communications systems which are subject to such local oscillator induced frequency error are provided.

Figure 5:
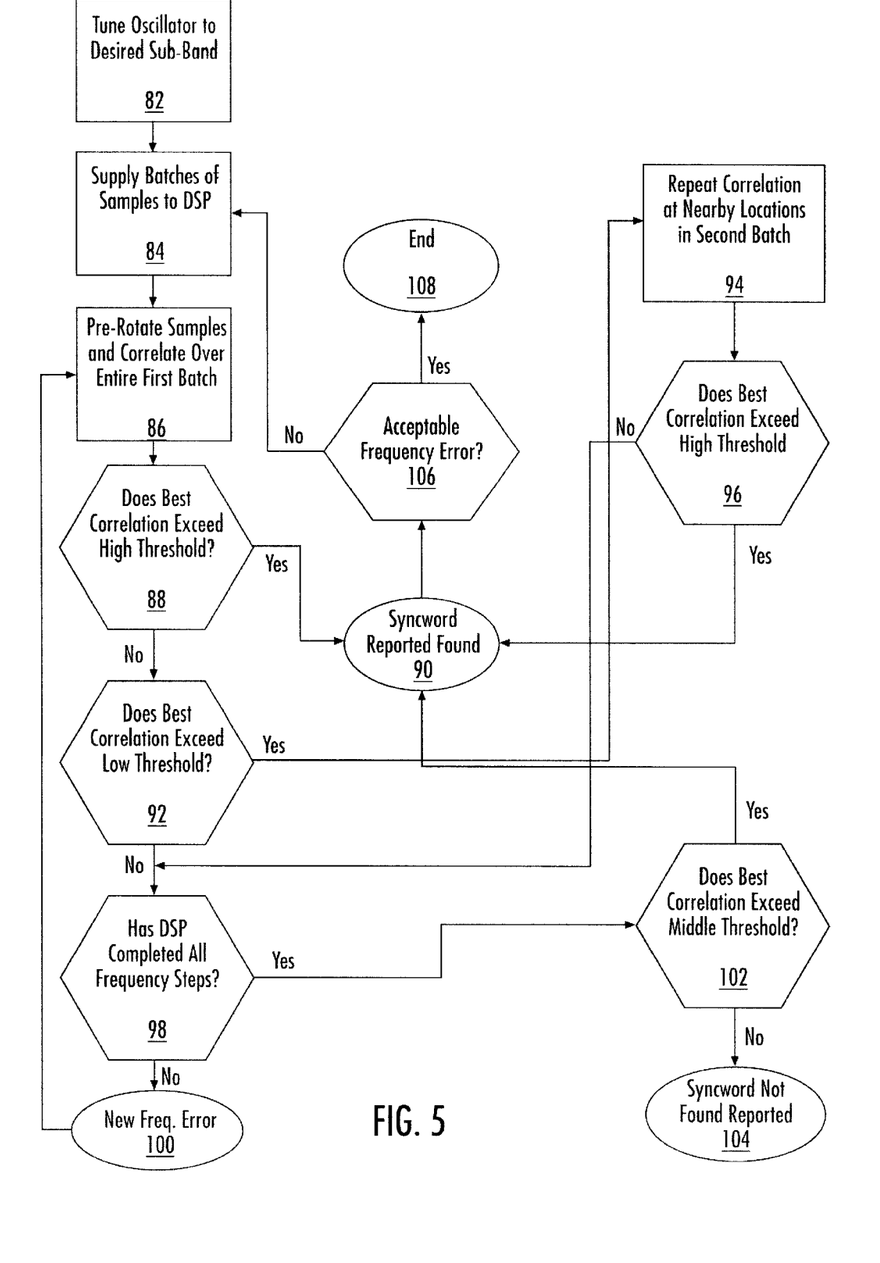
FIG. 5 is a flow chart illustrating a preferred embodiment of the synchronization systems and methods according to the present invention.
Figure 6:
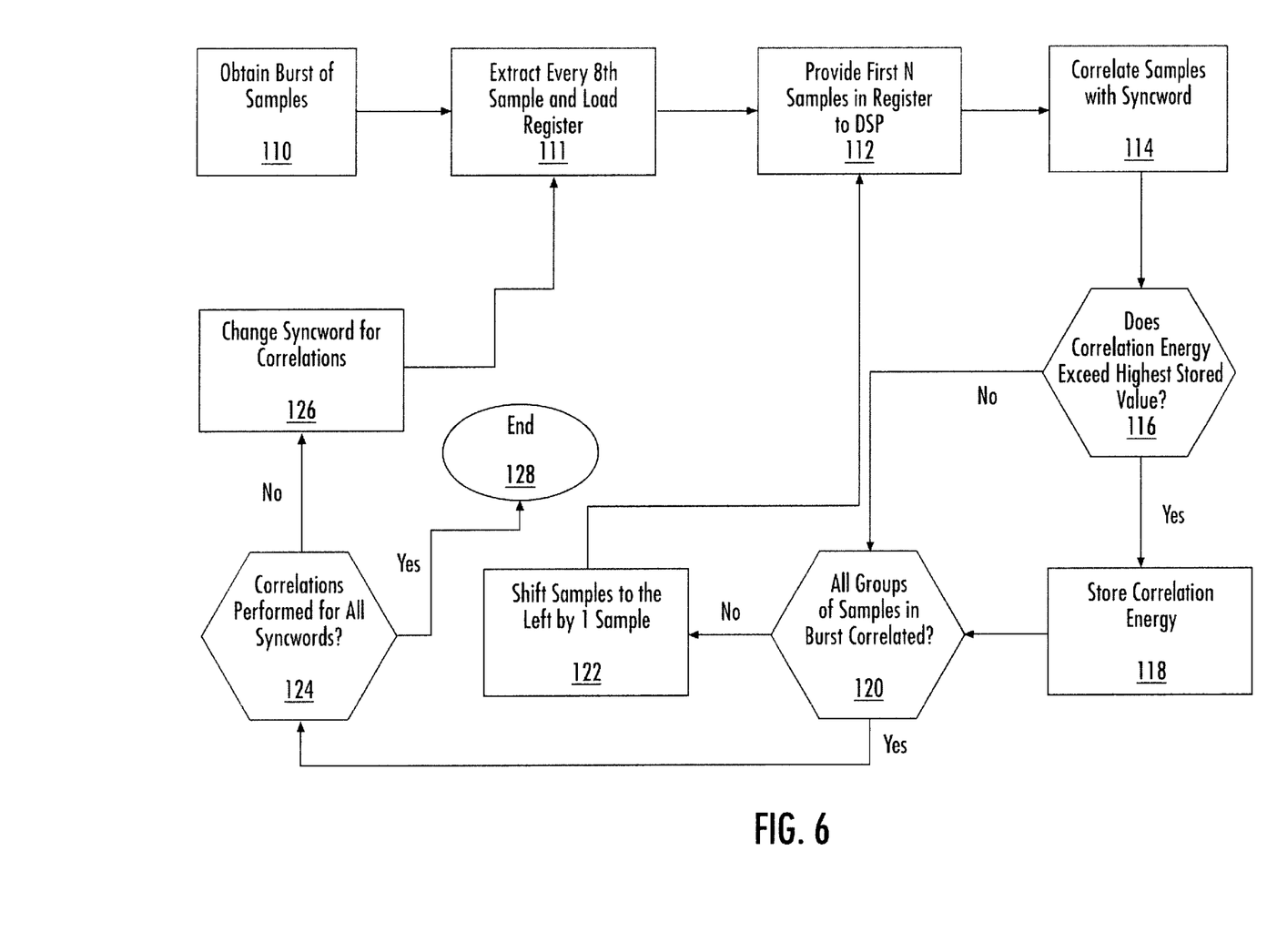
FIG. 6 is a flow chart illustrating systems and methods which may be used to correlate each unique set of consecutive samples in a batch of samples with a set of known syncwords.

The flow chart of FIG. 5 illustrates one such method. As shown in the figure, the local oscillator 58 is first tuned to the new radio frequency sub-band (block 82). The microprocessor 62 then configures the radio frequency receiver 54 or other hardware sample the received signal so as to supply one or more batches of complex samples to the digital signal processor 60 or other processing hardware/software (block 84). Preferably, the received signal is sampled at a relatively high sampling rate such as eight samples per symbol. However, as indicated below, typically fewer samples are used in the initial correlations. As will be understood by those of skill in the art, the complex samples may either comprise amplitude/phase samples or in-phase and quadrature ("I/Q") samples. Thus, depending upon the hardware/software available to perform the correlations, it may be desirable to convert phase-amplitude samples to I/Q samples or vice versa. As methods and systems for performing such conversions are known to those of skill in the art, they will not be discussed further herein.

The complex samples are provided to the digital signal processor 60. Initially the "batch" of samples provided to the digital signal processor 60 only comprises a subset of the samples (typically one sample per symbol). Processor 60 performs correlations over this entire batch of samples with each of the predefined syncwords (block 86), such that each unique group of consecutive samples which are the same length as the known syncword or syncwords are correlated with each syncword. Thus, for instance, if the initial correlations are performed at one sample per symbol in an ANSI-136 communications network, a total of 972 initial correlations would be performed at the first phase pre-rotation (162 correlations for each of the six potential syncwords). During these correlations, the digital signal processor 60 keeps track of the highest correlation energy identified, and the sample group and frequency rotation associated therewith. Once the correlations have been performed for the entire batch, the highest identified correlation energy value is compared to a relatively high detection threshold (block 88). If the correlation energy exceeds this threshold, then the digital signal processor 60 reports that the syncword has been located (block 90). If not, the highest identified correlation energy value is compared to a relatively low detection threshold (block 92). If the low detection threshold is exceeded, one or more additional correlations are performed for groups of samples which are located at locations "nearby" the group of samples with the highest identified correlation energy (block 94). As indicated above, these retry correlations are typically performed using all the samples (e.g., 8 samples per symbol) and at locations which are offset by less than a symbol from the group of samples with the highest correlation energy. The highest correlation energy associated with any of the retry correlations is then compared to a relatively high detection threshold (block 96). Typically, this will be the same threshold as used in block 88, although these two thresholds need not be identical. If the relatively high detection threshold is exceeded, then the digital signal processor 60 reports that the syncword has been located (block 90).

As shown in FIG. 5, if the highest identified correlation energy associated with the initial correlations of block 86 fails to exceed the relatively low detection threshold (block 92), or if the best correlation energy associated with the retry correlations of block 94 fails to exceed the relatively high detection threshold (block 96), the digital signal processor 60 determines if correlations have been performed at each necessary phase pre-rotation (block 98). If not, a different phase pre-rotation is applied to the samples (block 100), and the steps of blocks 86, 88, 92, 94, and 96 are repeated with the new phase pre-rotation. If correlations have been performed for all the necessary phase pre-rotations, the highest of all the correlation energy values (be it from a retry correlation or from one of the original correlations) is compared to an intermediate detection threshold (e.g., 80%) (block 102). If the correlation energy exceeds this threshold, then the digital signal processor 60 reports that the syncword has been located (block 90). If not, the digital signal processor 60 reports that the syncword has not been located (block 104).

Once a syncword is reported found, the frequency error associated with it is compared to a threshold for acceptable frequency error (block 106). If the reported frequency error is within an acceptable range, then the syncword is considered acquired (block 108). If the frequency error was too large, a new sample batch is provided by radio frequency receiver 54, and the steps of blocks 84, 86, 88, 92, 94, 96, 98, 100 and 102 are repeated. This process may continue until a syncword is located or until a timeout period expires.

In the claims appended hereto, reference is made to a first batch of digitized samples and to a second batch of digitized samples. As will be apparent from the above discussion, these two batches of samples may be obtained by sampling the received signal once at the sampling rate associated with the second batch of samples, and forming the first batch of samples by taking selected samples from the second batch of samples. Thus, for instance, if the initial correlations are to be performed at one sample per symbol and the retry correlations are to be performed at eight samples per symbol, the received signal may be sampled at eight samples per symbol to form the second batch of samples, and every eighth sample may be taken from the second batch of samples to form the first batch of samples. It will also be appreciated that the initial and retry correlations may be performed on groups of samples which were obtained using the same sampling rate. When this is the case, the first and second batches of samples may be identical.

It will also be appreciated in light of the present disclosure that while in FIG. 5 the relatively low and relatively high detection thresholds are only compared to the single best initial correlation and retry correlation, respectively, the thresholds may be checked with respect to each group of consecutive samples within the batch. This improves the probability of syncword detection, but typically increases processing delay.

As noted above with respect to both FIG. 4 (e.g., block 66) and FIG. 5 (e.g., block 86), a series of correlations are performed between groups of samples within a batch of samples and one or more predefined syncwords. The flow chart of FIG. 6 illustrates an exemplary method for performing these correlations. As indicated in FIG. 6, the received signal is sampled and a batch of samples is provided to the digital signal processor 60 (block 110). In the example of FIG. 6, the radio frequency signal is samples at a rate of eight samples per symbol (so that eight samples per symbol may be used during the retry correlations), and the initial correlations are performed at one sample per symbol. As shown in block 111, every eighth sample is then extracted and loaded into a register. The first N samples in the register are then provided to digital signal processor 60, where N is the number of symbols in the predefined syncwords.

The first group of N samples are then correlated with the first syncword (block 114), and the resulting correlation energy is compared to the highest previously stored correlation energy (block 116) which, in the case of the initial correlation, is zero. If the correlation energy exceeds the highest previously stored value, then the new value of correlation energy is stored in its place (block 118). The microprocessor 62 then checks to determine whether or not all groups of samples in the batch have been correlated with the first predefined syncword (block 120). If not, the group of samples in the register are shifted to the left by one (block 122) and the first N samples in the register (samples 2 through N+1) are correlated with the first syncword (blocks 112 and 114). This process continues until every consecutive group of N samples in the register has been correlated with the first syncword.

Once every group of N consecutive samples in the register has been correlated with the first syncword, the microprocessor 62 checks to see if correlations have been performed with all of the predefined syncwords (block 124). If not, the syncword is changed (block 126), and steps 112 through 122 are repeated for the new syncword. Once the correlations have been performed for each syncword, the process is complete (block 128).

In the drawings, specification and examples, there have been disclosed typical preferred embodiments of the invention and, although specific terms are employed, these terms are used in a generic and descriptive sense only and not for purposes of limitation, the scope of the invention being set forth in the following claims. Accordingly, those of skill in the art will themselves be able to conceive of embodiments of synchronization methods other than those explicitly described herein without going beyond the scope of the present invention.

That which is claimed is:

1. A method for locating a known multi-symbol syncword in a received signal, the method comprising the steps of:
    locating a potential syncword in a first batch of samples of the received signal having a correlation energy with the known syncword which exceeds a first predefined detection threshold;
    determining a correlation energy for a group of samples in a second batch of samples of the received signal with the known syncword, wherein the group of samples in the second batch of samples are selected based on the location of the potential syncword within the first batch of samples;
    comparing the correlation energy associated with the group of samples in the second batch of samples with a second predefined detection threshold that is higher than the first predefined detection threshold; and
    identifying the location of the known syncword based upon the comparison of the correlation energy associated with the group of samples in the second batch of samples with the second predefined detection threshold so as to only identify locations which have a correlation energy which exceeds both the first predefined threshold and the second predefined threshold.

2. The method of claim 1, wherein the step of locating the potential syncword comprises the steps of:
    identifying a group of consecutive samples within the first batch of samples which has the highest correlation energy with the known syncword; and
    comparing the correlation energy associated with the identified group of consecutive samples with a first predefined detection threshold.

3. The method of claim 1, wherein the group of samples in the second batch of samples are selected to correspond to substantially the same group of symbols as the potential syncword.

4. The method of claim 3, wherein the first sample in the group of samples in the second batch of samples is offset from the first sample in the potential syncword by less than one symbol position.

5. The method of claim 4, wherein the first sample in the group of samples in the second batch of samples is offset from the first sample in the potential syncword by approximately one-half of a symbol.

6. The method of claim 1, wherein the comparing step further comprises the step of comparing the correlation energy associated with the potential syncword with the second predefined detection threshold, and wherein the identifying step comprises the step of identifying the location of the known syncword based upon the comparisons of the potential syncword and the group of samples in the second batch of samples with the second predefined detection threshold.

7. The method of claim 1, wherein the identifying step comprises identifying the group of samples in the second batch of samples with a correlation energy exceeding the second predefined detection threshold.

8. The method of claim 1, wherein the first predefined detection threshold is within the range of 65% to 75%, and wherein the second predefined detection threshold is within the range of 85% to 95%.

9. The method of claim 1, further comprising the steps of:
    pre-rotating the phase of each sample in the first batch of samples and in the second batch of samples;
    locating a second potential syncword in the first batch of pre-rotated samples, wherein the second potential syncword is a group of consecutive samples within the first batch of pre-rotated samples which has the highest correlation energy with the known syncword;
    comparing the correlation energy associated with the second potential syncword with the first predefined detection threshold;
    determining a correlation energy for a group of consecutive samples in the second batch of pre-rotated samples, wherein the group of consecutive samples in the second batch of pre-rotated samples corresponds to substantially the same group of symbols as the second potential syncword; and
    comparing the correlation energy associated with the group of consecutive samples in the second batch of pre-rotated samples with the second predefined detection threshold;
    and wherein the identifying step comprises identifying the location of the known syncword as the group of consecutive samples in one of the comparing steps which has a correlation energy exceeding the second predefined detection threshold.

10. The method of claim 1, wherein the first batch of samples and the second batch of samples are taken from the same portion of the received signal.

11. A method for locating a known multi-symbol syncword in a received signal, the method comprising the steps of:
    locating a potential syncword in a first batch of samples of the received signal having a correlation energy with the known syncword which exceeds a first detection threshold;
    determining a correlation energy for a group of samples in a second batch of samples of the received signal with the known syncword, wherein the group of samples in the second batch of samples are selected based on the location of the potential syncword within the first batch of samples;
    comparing the correlation energy associated with the group of samples in the second batch of samples with a second detection threshold that is higher than the first detection threshold; and
    identifying the location of the known syncword based upon the comparison of the correlation energy associated with the group of samples in the second batch of samples with the second detection threshold and rejecting the location of the known syncword as a false positive if the correlation energy associated with the group of samples in the second batch of samples does not exceed the second detection threshold; and
    wherein the first batch of samples are obtained by sampling the received signal at a first sampling rate and wherein the second batch of samples are obtained by sampling the received signal at a second sampling rate that is higher than the first sampling rate.

12. A method for locating a known multi-symbol syncword in a received signal, the method comprising the steps of:
    locating a potential syncword in a first batch of samples of the received signal having a correlation energy with the known syncword which exceeds a first detection threshold;

determining a correlation energy for a group of samples in a second batch of samples of the received signal with the known syncword, wherein the group of samples in the second batch of samples are selected based on the location of the potential syncword within the first batch of samples;

comparing the correlation energy associated with the group of samples in the second batch of samples with a second detection threshold that is higher than the first detection threshold; and identifying the location of the known syncword based upon the comparison of the correlation energy associated with the group of samples in the second batch of samples with the second detection threshold and rejecting the location of the known syncword as a false positive if the correlation energy associated with the group of samples in the second batch of samples does not exceed the second detection threshold; and wherein the first batch of samples are obtained by sampling the received signal at one sample per symbol and wherein the second batch of samples are obtained by sampling the received signal at eight samples per symbol.

13. A system for locating a known multi-symbol syncword in a received signal, comprising:

means for locating a potential syncword in a first batch of samples of the received signal having a correlation energy with the known syncword which exceeds a first predefined detection threshold;

means for determining a correlation energy for a group of samples in a second batch of samples of the received signal with the known syncword, wherein the group of samples in the second batch of samples are selected based on the location of the potential syncword within the first batch of samples;

means for comparing the correlation energy associated with the group of samples in the second batch of samples with a second predefined detection threshold that is higher than the first predefined detection threshold; and means for identifying the location of the known syncword based upon the comparison of the correlation energy associated with the group of samples in the second batch of samples with the second predefined detection threshold so as to only identify locations which have a correlation energy which exceeds both the first predefined threshold and the second predefined threshold.

14. The system of claim 13, wherein the means for locating the potential syncword comprise:

means for identifying a group of consecutive samples within the first batch of samples which has the highest correlation energy with the known syncword; and means for comparing the correlation energy associated with the identified group of consecutive samples with a first predefined detection threshold.

15. The system of claim 13, wherein the means for comparing further comprises means for comparing the correlation energy associated with the potential syncword with the second predefined detection thereshold, and wherein the means for identifying comprises means for identifying the location of the known syncword based upon the comparisons of the potential syncword and the group of samples in the second batch of samples with the second predefined detection threshold.

16. The system of claim 13, wherein the means for identifying comprises means for identifying the group of samples in the second batch of samples with a correlation energy exceding the second predefined detection threshold.

17. The system of claim 13, wherein the first predetermined detection threshold is within the range of 65% to 75%, and wherein the second predefined detection thermoses is within the range of 85% to 95%.

18. The system of claim 13, further comprising:

means for pre-rotating the phase of each sample in the first batch of samples and in the second batch of samples;

means for locating a second potential syncword in the first batch of pre-rotated samples, wherein the second potential syncword is a group of consecutive samples within the first batch of pre-rotated samples which has the highest correlation energy with one the known syncword;

means for comparing the correlation energy associated with the second potential syncword with the first predefined detection threshold;

means for determining a correlation energy for group of consecutive samples in the second batch of pre-rotated samples, wherein the group of consecutive samples in the second batch of pre-rotated samples corresponds to substantially the same group of symbols as the second potential syncword; and means for comparing the correlation energy associated with the group of consecutive samples in the second batch of pre-rotated samples with the second predefined detection threshold;

and wherein the means for identifying comprises means for identifying the location of the known syncword as the group of consecutive samples wich has a correlation energy exceeding the second predefined detection threshold.

19. A system for locating a known multi-symbol syncword in a received signal, comprising:

means for locating a potential syncword in a first batch of samples of the received signal having a correlation energy with the known syncword which exceeds a first detection threshold;

means for determining a correlation energy for a group of samples in a second batch of samples of the received signal with the known syncword, wherein the group of samples in the second batch of samples are selected based on the location of the potential syncword within the first batch of samples;

means for comparing the correlation energy associated with the group of samples in the second batch of samples with a second detection threshold that is higher than the first detection threshold; and means for identifying the location of the known syncword based upon the comparison of the correlation energy associated with the group of samples in the second batch of samples with the second detection threshold;

means for sampling the received signal at a first sampling rate to provide the first batch of samples and means for sampling the received signal at a second sampling rate, that is higher than the first sampling rate, for providing the second batch of samples; and wherein the means for locating the potential syncword comprises:

means for identifying a group of consecutive samples within the first batch of samples which has the highest correlation energy with the known syncword; and means for comparing the coreelation energy associated with the identified group of consecutive samples with a first detection threshold.

20. The system of claim 19, wherein the means for identifying the location of the known synchword further comprises means for rejecting the location of the known syncword as a false positive if the correlation energy associated with the group of samples in the second batch of samples does not exceed the second detection threshold.

21. A system for locating a known multi-symbol syncword in a received signal, comprising:
a receiver subsystem for receiving a signal at a selected frequency and for sampling the signal at a sampling rate at least equal to the symbol rate of the received signal so as to provide first and second batches of samples;
a processor for:
locating a potential syncword in the first batch of samples having a correlation energy with the known syncword which exceeds a first predetermined detection threshold;
determining a correlation energy for a group of samples in the second batch of samples with the known syncword, wherein the group of samples in the second batch of samples are selected based on the location of the potential syncword within the first batch of samples;
comparing the correlation energy associated with the group of samples in the second batch of samples with a second predefined detection threshold that is higher than the first predefined detection threshold; and
identifying the location of the known syncword based upon the comparison of the correlation energy associated with the group of samples in the second batch of samples with the second predefined detection threshold so as to only identify locations which have a correlation energy which exceeds both the first predefined threshold and the second predefined threshold.

22. The system of claim 21, wherein the processor locates the potential syncword by:
identifying a group of consecutive samples within the first batch of samples which has the highest correlation energy with the known syncword; and
comparing the correlation energy associated with the identified group of consecutive samples with a first predefined detection threshold.

23. The system claim 21, wherein the group of samples in the second batch of samples are selected to correspond to substantially the same group of symbols as the potential syncword.

24. A system for locating a known multi-symbol syncword in a received signal, comprising:
a receiver subsystem for receiving a signal at a selected frequency and for sampling the signal at a sampling rate at least equal to the symbol rate of the received signal so as to provide first and second batches of samples;
a processor for:
locating a potential syncword in the first batch of samples having a correlation energy with the known syncword which exceeds a first detection threshold;
determining a correlation energy for a group of samples in the second batch of samples with the known syncword, wherein the group of samples in the second batch of samples are selected based on the location of the potential syncword within the first batch of samples;
comparing the correlation energy associated with the group of samples in the second batch of samples with a second detection threshold that is higher than the first detection threshold; and
identifying the location of the known syncword based upon the comparison of the correlation energy associated with the group of samples in the second batch of samples with the second detection threshold and rejecting the location of the known syncword as a false positive if the correlation energy associated with the group of samples in the second batch of samples does not exceed the second detection threshold; and
wherein the receiver subsystem obtains the first batch of samples by sampling the received signal at a first sampling rate and wherein the receiver subsystem obtains the second batch of samples by sampling the received signal at a second sampling rate that is higher than the first sampling rate.

25. A method for locating one of a plurality of known multi-symbol syncwords in a received signal, the method comprising the steps of:
locating a potential syncword in a first batch of samples of the received signal having a correlation energy with one of the plurality of known syncwords which exceeds a first detection threshold by identifying a group of consecutive samples within the first batch of samples which has the highest correlation energy with any one of the plurality of known syncwords and comparing the correlation energy associated with the identified group of consecutive samples with a first detection threshold;
determining a correlation energy for at least one group of samples in a second batch of samples of the received signal with the one of a plurality of known syncwords, wherein the at least one group of samples in the second batch of samples are selected based on the location of the potential syncword within the first batch of samples;
comparing the correlation energy associated with each of the at least one group of samples in the second batch of samples with a second detection threshold that is higher than the first detection threshold; and
identifying the location of the one of a plurality of known syncwords based upon the comparison of the correlation energy associated with each of the at least one group of samples in the second batch of samples with the second detection threshold;
wherein the first batch of samples are obtained by sampling the received signal at a first sampling rate and wherein the second batch of samples are obtained by sampling the received signal at a second sampling rate that is higher than the first sampling rate.

26. The method of claim 25, wherein at least one of the at least one group of samples in the second batch of samples are selected to correspond to substantially the same group of symbols as the potential syncword.

27. The method of claim 26, wherein the first sample in at least one of the at least one group of samples in the second batch of samples is offset from the first sample in the potential syncword by less than one symbol position.

28. The method of claim 25, wherein the comparing step further comprises the step of comparing the correlation energy associated with the potential syncword with the second detection threshold, and wherein the identifying step comprises the step of identifying the location of the one of a plurality of known syncwords based upon the comparisons of the potential syncword and the at least one group of samples in the second batch of samples with the second detection threshold.

29. The method of claim 25, wherein the identifying step comprises identifying the at least one group of samples in the second batch of samples with a correlation energy exceeding the second detection threshold.

30. The method of claim 25, wherein the first detection threshold is within the range of 65% to 75%, and wherein the second detection threshold is within the range of 85% to 95%.

31. The method of claim 25, wherein identifying the location of one of the plurality of known synchwords further comprises rejecting the location of one of the plurality of known synchwords as a false positive if the correlation energy associated with each of the at least one group of samples in the second batch of samples does not exceed the second detection threshold.

32. A method for locating a known syncword in a received signal, the method comprising:

locating a first portion of the received signal having a correlation with the known syncword which exceeds a first predefined detection threshold;

selecting a second portion of the received signal based on the location of the first portion of the received signal;

determining a correlation value representing the correlation between the second portion of the received signal and the known syncword;

comparing the determined correlation value with a second predefined detection threshold that is higher than the first detection threshold; and identifying the location of the known syncword based upon the comparison of the determined correlation value with the second predefined detection threshold so as to only identify locations which have a correlation energy which exceeds both the first predefined threshold and the second predefined threshold.

33. The method of claim 32, wherein the second portion of the received signal is offset from the first portion of the received signal by at least one-eighth of a symbol period associated with the received signal.

34. The method of claim 32, wherein locating a first portion of the received signal having a correlation with the known syncword which exceeds a first predefined detection threshold comprises correlating samples of the received signal obtained at a first sampling rate with the known syncword to identify a group of samples having a correlation exceeding the first predefined detection threshold, and wherein determining a correlation value representing the correlation between the second portion of the received signal and the known syncword comprises correlating samples of the received signal obtained at a second sampling rate that exceeds the first sampling rate with the known syncword.

35. The method of claim 32, wherein locating a first portion of the received signal having a correlation with the known syncword which exceeds a first predefined detection threshold comprises:

identifying a portion of the received signal which has the highest correlation with the known syncword; and comparing the correlation of the identified portion of the received signal with the known syncword to a first predefined detection threshold.

* * * * *

UNITED STATES PATENT AND TRADEMARK OFFICE
CERTIFICATE OF CORRECTION

PATENT NO. : 6,452,991 B1
DATED : September 17, 2002
INVENTOR(S) : Zak

It is certified that error appears in the above-identified patent and that said Letters Patent is hereby corrected as shown below:

Column 15,
Line 60, should read -- the second predefined detection threshold and wherein the --

Column 16,
Line 2, should read -- energy exceeding the second predefined detection threshold --
Line 3, should read -- 17. The system of claim 13, wherein the first predefined --
Line 5, should read -- 75%, and wherein the second predefined detection threshold --
Line 19, should read -- means for determining a correlation energy for a group --

Column 17,
Line 17, should read -- syncword which exceeds a first predefined detection --

Signed and Sealed this

Eleventh Day of March, 2003

JAMES E. ROGAN
*Director of the United States Patent and Trademark Office*